United States Patent Office 3,406,773
Patented Oct. 22, 1968

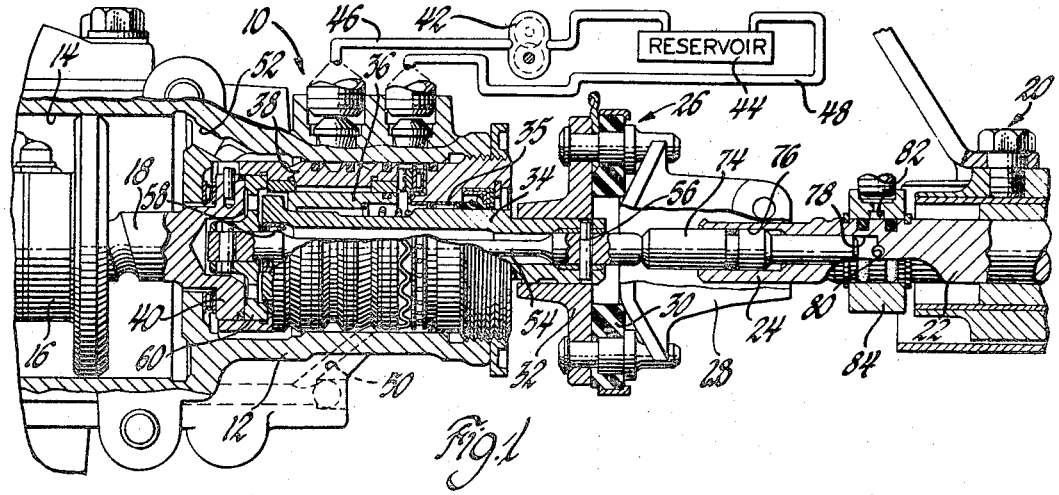
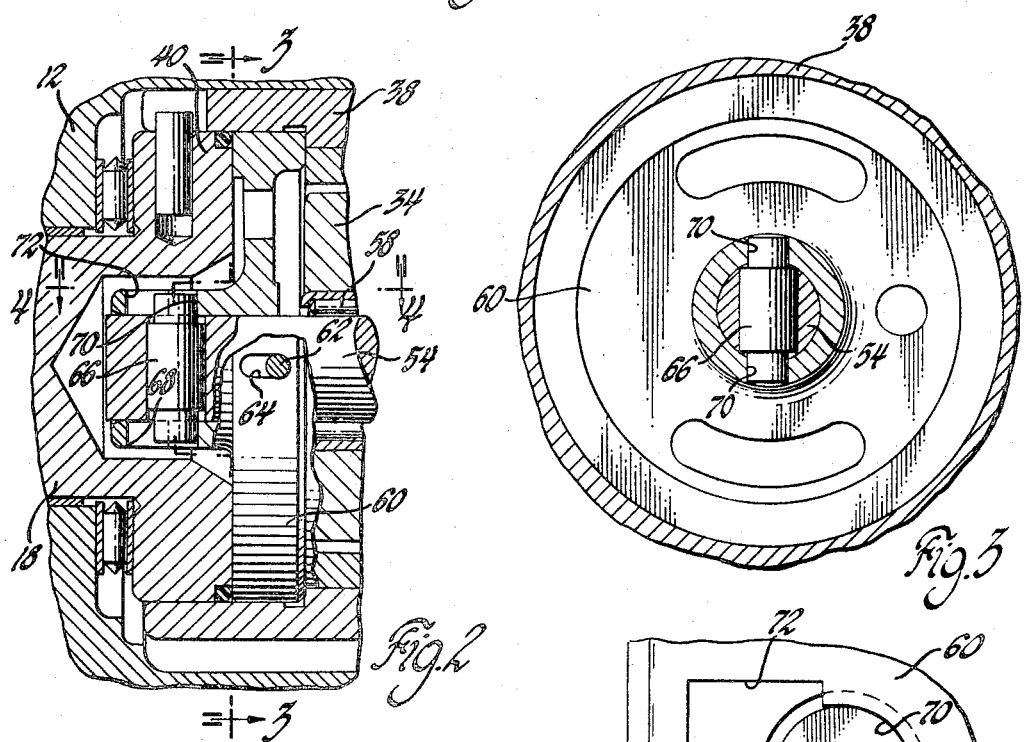
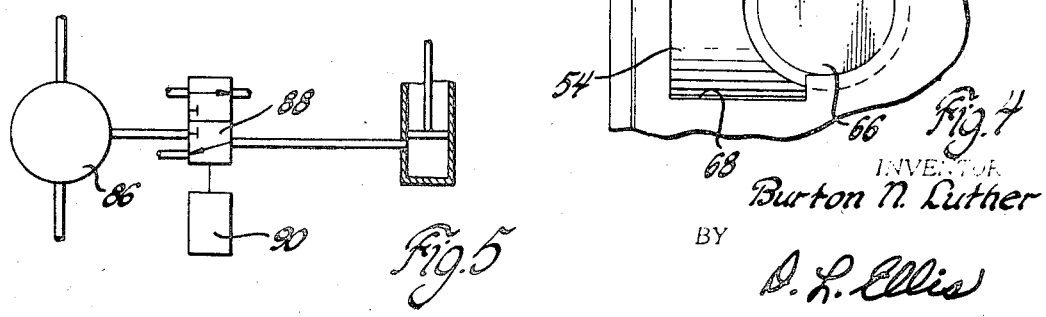

3,406,773
POWER STEERING GEAR
Burton N. Luther, Detroit, Mich., assignor to General Motors Corporation, Detroit, Mich., a corporation of Delaware
Filed Oct. 27, 1967, Ser. No. 678,665
4 Claims. (Cl. 180—79.2)

ABSTRACT OF THE DISCLOSURE

In a hydraulic power steering gear of the type including a rotary control valve having an inner valve member rotatable by the input steering shaft, a concentric outer valve member mounted for rotation with an output worm, and a centering torsion rod connected between the input steering shaft and the output worm to center the valve parts in neutral or nonactuated position and to resiliently oppose manual effort on the steering input shaft moving the valve members from such neutral relation, provisions are made whereby the torsion rod may be selectively disconnected from the output worm during certain operating conditions of the vehicle to remove opposition to manual input effort. The disconnection is accomplished by permitting limited axial movement of the torsion rod from a normal operative position wherein a connecting pin on the torsion rod is engaged with the output worm, to an inoperative position wherein the pin is permitted lost motion with the input shaft relative to the output worm under manual turning effort.

---

It is conventional practice in the design of power steering gears to provide within the control valving therefor some instrumentality of artificial "feel" responsive to the degree of manual steering effort applied to the vehicle steering wheel to provide a proportionate degree of resistance to such effort indicating the amount of road load at the steered wheels. Such resistance is highly desirable in most driving conditions but may in certain cases be found objectionable where prolonged and higher magnitude steering wheel efforts are required such as, for example, during parking.

The present invention is particularly addressed to steering gears incorporating strictly mechanical elastic "feel" devices and has as its primary object to provide in a steering gear such an elastic artificial "feel" device operable for the majority of driving conditions of the vehicle but which may be disabled during parking or other minimum speed driving conditions to provide for no-effort power steering.

A more particular object of this invention is to provide a power steering gear including a torsion rod centering device wherein the torsion rod is torsionally engaged between the manual input and the output of the gear to operate in normal manner during most driving conditions to provide resistance to manual steering effort, but which during certain predetermined parking or other maneuvers is disengaged and rendered ineffective to resist the manual steering effort.

These and other objects, features and advantages of the invention will be readily seen in the following specification and drawings wherein:

FIGURE 1 is a fragmentary sectional view of a power steering gear according to this invention;

FIGURE 2 is an enlarged view of a portion of FIGURE 1;

FIGURE 3 is a sectional view taken generally along the plane indicated by lines 3—3 of FIGURE 2;

FIGURE 4 is an enlarged view taken generally along the plane indicated by lines 4—4 of FIGURE 2; and FIGURE 5 is a schematic of a portion of the control system for positioning of the torsion rod centering device of the steering gear.

Referring now particularly to FIGURE 1 of the drawings, an illustrative embodiment of the power steering gear of this invention is shown in conjunction with a portion of the steering column apparatus therefor. The power steering gear proper, designated generally as 10, is of the so-called inline integral type and accords generally with the disclosure of Ziegler et al. Patent No. 3,022,772, assigned to the assignee of the present invention. Reference may be had to that patent for a complete description of the gear but generally it includes a housing 12 providing a power cylinder 14 containing a reciprocable ball nut-piston 16 drivingly engaged with a rotatable output worm 18 by a recirculating train of bearing balls in a manner well understood in the art. The ball nut-piston 16 connects with the usual rotatable pitman shaft to the steering linkage of the vehicle by suitable rack and sector gearing or the like, equally well-known and not shown. At the manual input side of the steering gear, the usual steering column 20 has rotatably disposed therewithin a steering shaft 22 connecting with the steering wheel inside the vehicle passenger compartment. The lower end 24 of the steering shaft 22 has nonrotatably mounted thereon the upper coupling portion 28 of a flexible coupling 26, such coupling further including an elastomeric isolating web 30 and a lower coupling portion 32. For a complete disclosure of the type of coupling shown, reference may be had to Burton Patent No. 2,753,848, also assigned to the assignee herein. Lower coupling portion 32 is nonrotatably mounted as by splines or the like to the upper end of a stub shaft 34 of the steering gear 10.

Stub shaft 34 adjacent its rightward end is mounted by a needle roller bearing 35 for rotation on housing 12 under manual turning effort applied through steering shaft 22 to in turn rotate an inner valve member 36 of a rotary control valve of the steering gear 10, such valve member being nonrotatably but slidably engaged on the stub shaft in a suitable manner such as shown in Ziegler. The outer concentric member or sleeve 38 of the rotary valve is rotatably mounted within housing 12 and is nonrotatably connected at its left end to the enlarged end 40 of worm 18 by a pin in the latter received in a slot of the valve sleeve. The inner valve member 36 and valve sleeve 38 are provided with suitable porting for controlling flow therethrough of pressurized hydraulic fluid from a pump 42 drawing from a reservoir 44, the pump and reservoir being connected to the rotary valve assembly by pressure and return lines 46 and 48 respectively. The rotary control valve is of the so-called open-center type wherein hydraulic circuit is established through the control valve to either side of the ball nut-piston 16, through respective passages 50 and 52 in housing 12, when the inner valve member 36 and valve sleeve 38 are located in a neutral relation corresponding to zero manual effort applied by the vehicle operator. The porting of these valve members is such that upon a manual effort or torque being applied through steering shaft 22 to effect either a right or a left turn, the stub shaft 34 rotates inner valve member 36 in a corresponding direction relative to valve sleeve 38 from such neutral position to effect increased system pressure from pump 42 to a corresponding side of ball nut-piston 16 via either passage 50 or passage 52, the other side of the ball nut-piston being concurrently permitted full exhaust from the other of such passages through the control valve of the reservoir 44.

The input components for the steering gear including the steering shaft 22, stub shaft 34 and inner valve member 36 are held in neutral relation to the outer sleeve 38 and output worm 18 by a torsion rod 54. The rightward end of the torsion rod is rigidly nonrotatably connected to stub shaft 34 by a pin 56. The leftward end of the torsion rod is rotatably supported on the adjacent end of stub shaft 34 by needle bearings 58 and has connection, presently to be described in detail, to an end cap 60. Referring to FIGURE 3, the end cap 60 seats directly against the worm end 40 and, to constitute an element in the output train of the steering gear, is nonrotatably connected to outer sleeve 38 by a pin 62 in the sleeve received within an elongated slot 64 of the end cap. Further details of the various components of the rotary valve along with the specific porting of the inner valve member 36 and valve sleeve 38 may be had upon reference to the above-noted Zeigler et al. patent. Described therein also are the details of the fail-safe abutment arrangement between stub shaft 34 and worm end 40 not shown herein and which, in the event of pump failure or other loss of system pressure, accomplishes direct driving input-output connection between the steering shaft 22 and the output worm 18 to provide for manual steering.

Referring now to FIGURES 2 through 4, the leftward end of torsion rod 54 is connected to end cap 60 by a pin 66 mounted within the torsion rod and having protruding reduced ends received in diametrically opposed contoured apertures 68 in the hub of the end cap. These apertures each include a first portion 70 contoured precisely for firm embrace of the respective end of pin 66 to provide rigid nonrotatable connection between the torsion rod and end cap, and an enlarged portion 72 providing a limited amount of rotational lost motion of the pin ends relative to the end cap in either direction from the neutral position of the stub shaft 34. This degree of lost motion is roughly equivalent to that provided by the fail-safe abutments on the stub shaft and worm end 40.

Stub shaft 34 and the contained torsion rod 54 are permitted a limited degree of axial travel within steering gear 10 between the position shown generally in the drawings, and a leftwardly displaced position wherein the inner end of the stub shaft approaches abutment with end cap 60. With the pump 42 operating when the vehicle engine is running, the return line pressure obtaining within the control valve cavity of housing 12 is sufficient to urge the torsion rod 54 and stub shaft 34 to the rightward position shown under the unbalanced pressure experienced on the face of the extreme leftward end of the torsion rod. In such position, the projecting ends of pin 66 are received in aperture portions 70 to rigidly nonrotatably connect the torsion rod and the end cap, thereby rendering the torsion rod active to torsionally resist relative rotation between the stub shaft 34 and worm 18 when manual steering effort is applied through steering shaft 22 to actuate the rotary control valve of the gear. Such resistance, as is well-known, provides artificial "feel" to the vehicle operator indicative of the road load at the steered wheels counteracting the pressurization of ball nut-piston 16 which seeks to turn the steered wheels. This is as desired in most driving conditions. However, as the torsional resistance encountered with torsion rod 54 is sometimes found objectionable during low speed parking maneuvers or the like, the same may be eliminated simply by displacing stub shaft 34 and torsion rod 54 leftwardly to locate the ends of pins 66 in the enlarged portion 72 of each end cap aperture 68. The stub shaft and torsion rod may accordingly be rotated relative to worm end 40 within the limits of aperture portions 72 to rotatably actuate inner valve member 36 and achieve virtually effortless power assist.

Referring to FIGURE 1, means for selectively shifting stub shaft 34 and torsion rod 54 leftwardly for such no-effort power assist includes a stepped-diameter piston 74 bearing at one end on the end of torsion rod 54, the piston being received within a bore 76 of the steering shaft 22 and a counterbore pressure chamber 78. Chamber 78 communicates via a radical passage 80 in the steering shaft to an annular groove 82 in a sleeve 84 fixed to the steering shaft. The groove 82 communicates by a suitable connection to a pressure line from a source of compressed air or like fluid. Referring to FIGURE 5, such air source 86 is controlled by a three-way valve 88 shiftable between a normal position closing off the air source and opening the pressure chamber 78 to atmosphere, and an actuated position connecting the air source and the pressure chamber. A solenoid 90 may be provided to achieve the latter condition when energized, such energization being accomplished by a suitable electrical control circuit which is responsive, for example, to a predetermined low vehicle speed below which the solenoid is energized to cause pressurization on piston 74. The predetermined vehicle speed may be selected as approximately two miles per hour, consistent with the parking maneuvering for which the no-effort steering is desired.

Pressurization on piston 74 during these conditions shifts the same leftwardly to displace the torsion rod 54 and stub shaft 34 leftwardly against the pressure within the rotary valve cavity. The stub shaft 34, and with it the lower flex coupling portion 32 are permitted such displacement by the flexibility of flex coupling 26 in an axial direction provided by the elastomeric web 30. Such resilient flexing provides a measure of aid to the unbalanced system pressure on the leftward end of the torsion rod to return the torsion rod and the stub shaft 34 to its normal rightward operative position shown, when the pressure on piston 74 is relieved by shifting of valve 88 to nonactuated position.

It is apparent that an improved power steering gear is provided enabling selective no-effort power assist through controlled disablement of the conventional torsion rod or other artificial "feel" centering device of the gear. It is further apparent that the inventive principles as described herein with specific reference to a torsion rod device are equally applicable to other mechanical spring and like resilient centering arrangements.

Having thus described the invention, what is claimed is:

1. A vehicle power steering gear comprising an output member, an input member operable by a manual steering instrumentality, a fluid motor connected to said output member, a source of fluid pressure, a fluid control valve having respective parts unitarily movable one with said output member and another with said input member, said valve parts upon relative movement therebetween from a neutral position being operative to connect said fluid pressure source to said fluid motor for pressurization of the latter, resilient centering means adapted to locate said valve parts in said neutral position thereof and to provide a resistance to manual steering effort moving said input member and its respective valve part relative to said output member and its respective valve part from said neutral position, first connecting means connecting said resilient centering means with one of said input and output members, second connecting means for connecting said centering means with the other of said input and output members, said second connecting means being movable between a first position engaging said centering means with said other member and a second position wherein said centering means and said other members are disengaged, and control means normally locating said second connecting means in the first position thereof for obtaining resistance from said centering means to manual effort applied to said input member and being responsive to a predetermined operating condition of the vehicle to locate said second connecting means in the second position thereof wherein said centering means is ineffective to resist manual effort applied to said input member.

2. A vehicle power steering gear comprising a rotatable output member, a rotatable input member operable by a manual steering instrumentality, a fluid motor connected to said output member, a source of fluid pressure, a rotary fluid control valve having respective parts unitarily rotatable one with said output member and another with said input member, said valve parts upon relative rotation therebetween from a neutral position being operative to connect said fluid pressure source to said fluid motor for pressurization of the latter, a torsion centering member adapted to locate said valve parts in said neutral position thereof and to provide a resistance to manual steering effort rotating said input member and its respective valve part relative to said output member and its respective valve part from said neutral position, first connecting means connecting one end of said torsion member with one of said input and output members, second connecting means for selectively connecting the opposite end of said torsion member nonrotatably with the other of said input and output members, said second connecting means being movable between a first position connecting said opposite end of said torsion member nonrotatably with said other of said members and a second position wherein said torsion member opposite end and said other member are disconnected for relative rotation and control means normally locating said second connecting means in the first position thereof for obtaining resistance from said torsion member to manual effort applied to said input member and being responsive to a predetermined operating condition of the vehicle to locate said second connecting means in the second position thereof wherein said centering means is ineffective to resist manual effort applied to said input member.

3. A vehicle power steering gear comprising, an output member, a fluid motor connected with said output member, a rotatable input shaft operable by a manual steering instrumentality, a source of fluid pressure, a rotary valve concluding concentric inner and outer valve members for controlling flow from said fluid pressure source to said fluid motor upon relative rotation between said valve members from a neutral position thereof, said inner valve member being nonrotatably connected with said input shaft and said outer valve member being nonrotatably connected with said output member, abutment means for drivingly connecting said input shaft and said output member upon predetermined limited rotation of said input shaft relative to said output member from the neutral position of said valve members, a torsion rod adapted to be connected between said input shaft and said output member to resiliently center said valve members in the neutral position thereof and provide a resistance to manual steering effort rotating said input shaft and said first valve member relative to said output member and said second valve member from said neutral position, said torsion rod being axially movable relative to said input shaft and said output member, first means connecting one end of said torsion rod nonrotatably with one of said input shaft and output member at all times, second means operable in a first axial position of said torsion rod to rigidly connect the other end of said torsion rod nonrotatably with the other of said input shaft and output member and operable to disconnect said torsion rod from said other member for limited rotational movement relative thereto generally within the lost motion limits of said abutment means when said torsion rod is moved axially from said first position to a second position, means normally holding said torsion rod in said first axial position thereof, and fluid motor actuating means including a piston operable upon said torsion rod for selectively moving the latter from the first to the second position thereof against said holding means.

4. The structure recited in claim 3 wherein said second connecting means includes a pin on one of said torsion rod or said other of said input shaft and output members engaged within a recess of the other thereof including a first rotatably constraining portion embracing the pin in the first axial position of said torsion rod and an enlarged lost motion portion receiving said pin in the second axial position of said torsion rod.

References Cited

UNITED STATES PATENTS

| 2,988,059 | 6/1961 | Wysong | 91—375 |
| 3,033,051 | 5/1962 | Reinke et al. | 91—375 |
| 3,296,940 | 1/1967 | Eddy et al. | 91—375 |

PAUL E. MASLOUSKY, *Primary Examiner.*